J. Amory,

Steam-Boiler Furnace.

No. 2,058. Reissued Aug. 29, 1865.

Witnesses
Joseph Gavell
Samuel A. Piper

Inventor
Jonathan Amory.

UNITED STATES PATENT OFFICE.

JONATHAN AMORY, OF WEST ROXBURY, MASSACHUSETTS.

IMPROVEMENT IN STEAM-BOILER FURNACES.

Specification forming part of Letters Patent No. 23,650, dated April 19, 1859; Reissue No. 2,053, dated August 29, 1865.

DIVISION No. 2.

*To all whom it may concern:*

Be it known that I, JONATHAN AMORY, of West Roxbury, in the county of Norfolk and State of Massachusetts, have invented certain new and useful Improvements in Furnaces for Steam-Boilers and other Heat-Generators; and I do hereby declare that the following is a full, clear, and exact description of the same, reference being had, for the purpose of illustration, to the accompanying drawings, in which—

Figure 1:
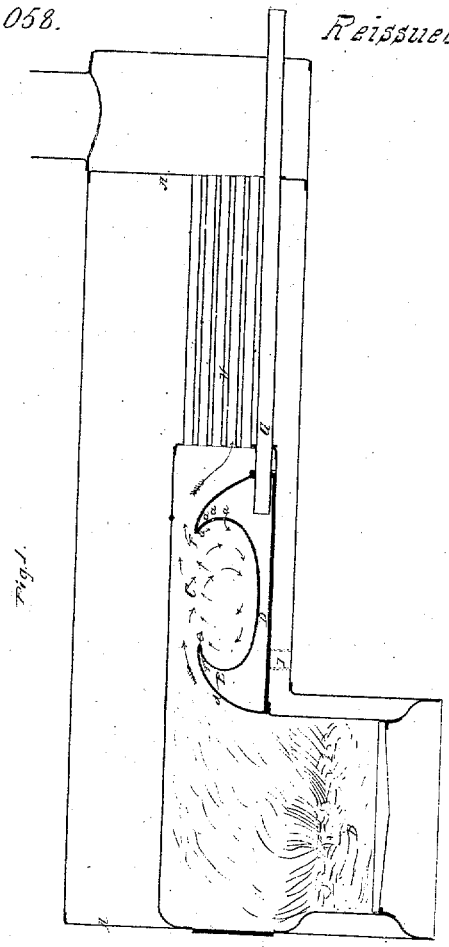
Figure 2:
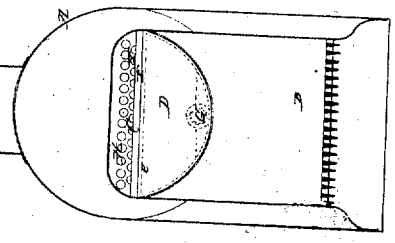

Figure 1 is a longitudinal sectional elevation of a locomotive-boiler to which my invention is applied; Fig. 2, a transverse section through the fire-box.

The effect of fuel upon productiveness of nations, the wealth and comfort of the people is too well known to require any comment on the transcendent importance of its economical use. Heat, the now indispensable agent in the various branches of manufacture, of transportation, and of protection against inclemency of weather, can only be obtained at the expense of fuel; but the amount of heat obtained from fuel by the modes heretofore practiced is far below its theoretical value. Immense quantities of fuel are daily lost without any useful effect by being discharged in the form of smoke through chimneys, while a considerable portion of the heat is not evolved. To remedy this evil is the object and aim of my improvements.

My invention is based on the fact that heat evolved by combustion is proportionate to the quantity of oxygen consumed, that fuel is the more combustible, the lighter, and more divided. The problem was, therefore, first, to convert fuel of whatever derivation or kind into a light and highly-divided combustible substance, and, second, to supply such light and highly-divided substance with abundance of oxygen. To this end the fuel is burned so as to evolve combustible gases which are then mixed with air (heated to be readily decomposed) and consumed. The heat thus generated is the heat evolved by this latter combustion superadded to the heat previously acquired by the gases.

In order that the principle of my invention and its operation may be fully understood, I shall suppose an ordinary fire-chamber or furnace, (of a boiler, for instance,) provided with the usual fire-grate, which is charged through the fire-door with fuel. The air entering from under the grate, the coal (if such be the fuel) will burn from its under surface upward. The descending coal is thus entirely consumed, producing carbonic acid and ashes. The latter fall through the grate while the former ascending through the upper strata of coal, which, being ignited by the heat of the mass below, is converted into carbonic oxide and mingles with the vapors or gases generated in the upper portions of the coal. These vapors or gases vary with the nature of the fuel, but consist mainly of hydrocarbons. Such is the composition of the gases which in ordinary furnaces and boilers are carried through the flues or other heating media, and constitute, in fact, the principal heating element.

If it be now considered that the heat evolved by the chemical action of combustion—that is, by the burning of carbon into carbonic acid—is about 4,000°, while the imperfect combustion of carbon, *i. e.*, its conversion into carbonic oxide—produces but 1,200°, it will be readily understood that the heat at the grate is reduced to less than one-third in the fire-chamber above, and that there is consequently a great waste or wasteful use of fuel. On the other hand the gases in the fire-chamber are highly combustible and carried off in the combustible but unconsumed state to the chimney because of the want of a proper supply of oxygen. These combustible gases may thus be considered as fuel in the very best conditions for efficiency, it being light, in a high state of division, and already highly heated. If with these gases atmospheric air, also highly heated, be mixed, they will burn and evolve heat due to their chemical action, producing an intensely-heated flame.

With an understanding of the principles of this invention, its general application to the various furnaces used in the useful arts and manufactures may be exemplified, subject to modifications by its adaptation to a locomotive-boiler.

At a convenient distance from the fire-box, and within the boiler, I provide a combustion-chamber, which may be made in the form of the fire-curves described in Letters Patent issued to H. F. Baker on the 30th May, 1846, and consists in constructing that part of the curves toward the fire-place by continuing the curve upward and forward, so as to make the curve terminate in a thin overhanging projection, which, in connection with the other parts of the "curve," serves to insure a more perfect rotation or eddying of the gases from the fire-place in said chamber, so that in connection with the orifices for the admission of air in said curves a more intimate mixing of the air with the gases is effected, and being thus mixed they are so presented to the incoming current of flame as to insure their complete combustion.

The curves are made in preference of metal properly heating the air to be thrown into the combustion-chamber, as before explained.

In the construction of the curves of locomotive-boilers, as shown in the drawings, they must, however, necessarily be made of metal both from the less space occupied than would be if bricks were used for security against being destroyed by the jostling of the locomotive in running over the inequalities of the road, and also for the reason that they can be more conveniently connected with the boiler; but unless the metal curves were in some way protected from the fierce heat of the flame from the fire-place, or more especially on that side next to the fire place, they would be destroyed in a few hours. To prevent this result, and at the same time to heat the air to be thrown into the combustion-chamber, I make the space or chamber behind the curves the heater, and by so bringing in the current of air as to throw the current against the most heated side of the chamber, which, by rapidly absorbing the heat, keeps the metal so cool as to preserve it while the air is heated to a degree proper to be injected into the combustion-chamber, and then combined with the unconsumed gases.

The drawings represent a locomotive-boiler as disconnected from all accessory parts.

A is the boiler, B, the fire-chamber; C, the combustion-chamber, and D the metallic curves which inclose the combustion-chamber, as shown, and also serve as a heating-chamber for the air before it passes into the combustion-chamber. The more remote extremity of the curve F is formed much like the corresponding part of the curve described in Baker's patent, before mentioned, excepting as to the admission of the air, which is here admitted through the holes *a a*, &c., as shown, but at the opposite extremity E it is made with an internal curve, *d*, uniting with the internal curve in a horizontal position, forming an overhanging projection, as shown in the drawing at *e*, over which externally the products of combustion from the fire-place are guided so as to insure the formation of an eddy or vortex within the combustion-chamber, for the purpose to be hereinafter described. Between the interior and exterior curves, at *e*, is a long narrow aperture, extending the whole breadth of the curves, through which the air passes into the combustion-chamber. This serves both to protect the thin extremities of the curves from the intense heat of the flame as it comes from the fire-chamer, and distributes the air evenly to the volume of gases passing over it. The air is supplied to the outer part of the volume through the holes *a a*, &c., in the other extremity of the curve, which also protects that part of the extreme heat. In the curves of the Baker furnace, before mentioned, they are shown in the patent of such form as to cause the rotation of the eddies formed in the chambers to be in a backward direction, or with the returning stratum uppermost, but it is found by experiment that the natural tendency of the eddy is to revolve in the opposite direction. My improvement in the form of the curve is designed to carry out that principle and insure the more perfect formation of the eddy, by the action of which the intimate mixture of the air with the gases is effected to adapt them to complete combustion.

The air is admitted into the heating-chamber through the pipe G, extending forward of the boiler, being forced in by the draft, and also by the progressive movement of the engine; but it may be admitted at any other part, as at I, provided the currents are thrown upon the more heated parts to protect them. H are the tubes, constructed in the usual way, except that they are shorter and extend only to the recess in which the curves are placed, which occupies the space usually occupied by the tubes.

The operation of the improvements is believed to be sufficiently obvious from the drawings and description, and may be considerably modified in form without changing the principles.

Having thus described my invention and the manner in which the same is or may be carried into effect, I claim—

1. Admitting into the fire-box or chamber of furnaces or heat-generators so as to impinge upon and mix with the flame or products of combustion atmospheric air by means of and in combination with conduits or receptacles so arranged within or in relation to said furnace or heat-generator as to heat the air to the proper degree of temperature during its passage to the said fire-box or chamber, in the manner and for the purposes hereinbefore set forth.

2. The herein-described method of generating heat—that is to say, forming gaseous fuel by burning coal or other solid fuel, as described, and conveying such gaseous fuel to a separate chamber, there to be consumed by combining with heated air, as set forth.

3. The combination of a fire-chamber of ordinary or suitable construction for burning solid fuel and for producing combustible gases, with a combustion-chamber in which said combustible gases are mixed with air and burned in the manner hereinbefore described.

In testimony whereof I have signed my name to this specification before two subscribing witnesses.

JONATHAN AMORY.

Witnesses:
JOSEPH GAVETT,
A. POLLOK.